Patented Feb. 6, 1951

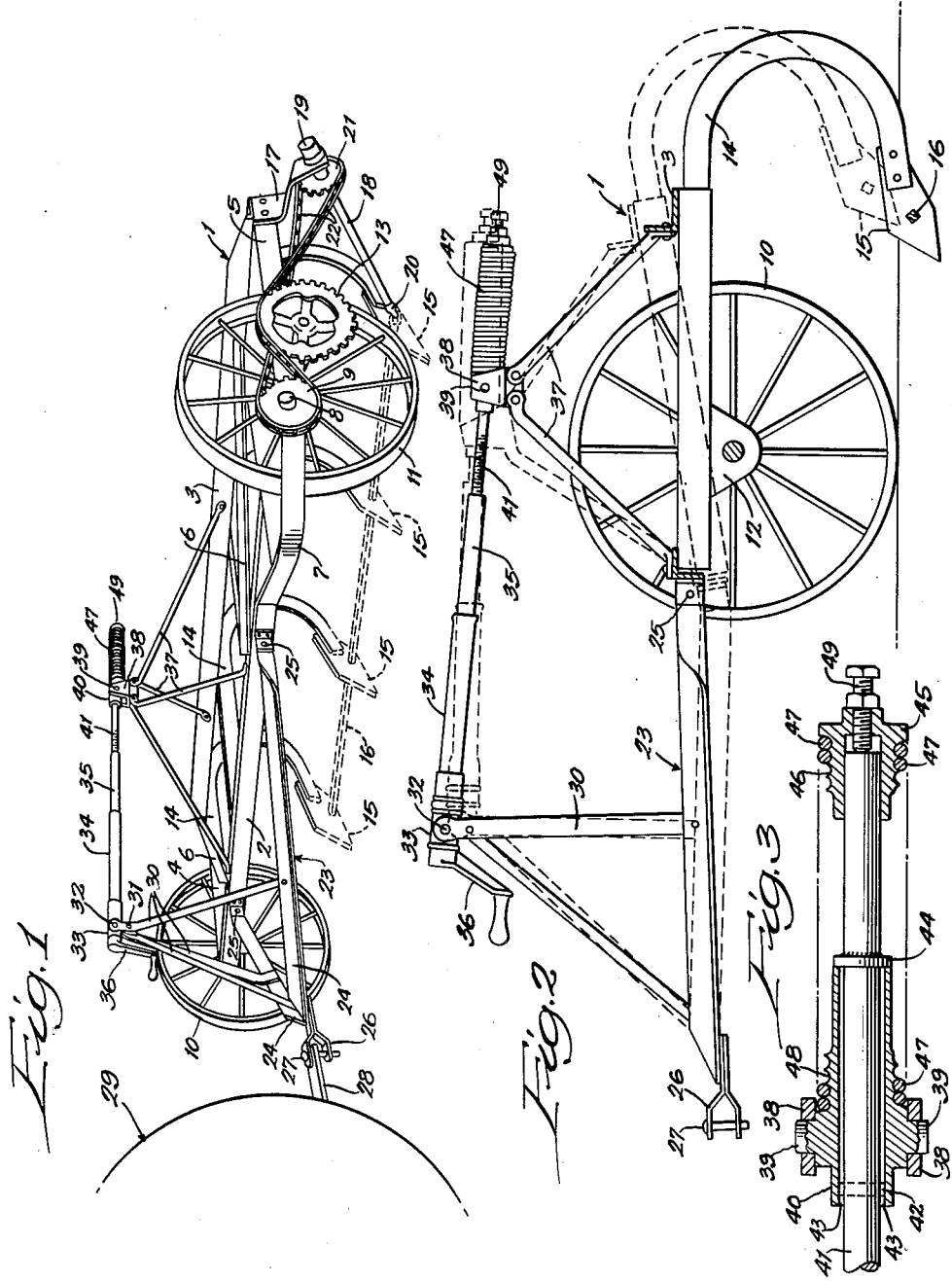

2,540,265

UNITED STATES PATENT OFFICE 2,540,265

BREAK JOINT FRAME

Howell N. James, Hamilton, Ontario, Canada, assignor to International Harvester Company of Canada, Limited, Hamilton, Ontario, Canada, a corporation of Ontario Application June 18, 1945, Serial No. 600,192

2 Claims. (Cl. 97—236)

This invention relates to an agricultural implement and particularly to a self-supporting implement of the wheeled type adapted to be drawn by a tractor or the like. More specifically, the invention relates to a rod weeder.

An object of the invention is the provision of a rod weeder having a main tool-carrying frame, a draw-frame pivotally connected thereto and resilient means connecting said frames.

Another object is to provide in an agricultural implement a wheel-supported tool-carrying main frame having a draw-frame pivotally connected thereto to permit vertical swinging movement of the tool, an upright support on each of said frames, means adjustable in length connecting the supports and resilient means connecting the adjustable means to one of the supports to permit vertical swinging movement of the tool-carrying frame against the action of the spring.

Other objects and advantages will become clear from the following detailed description when read in conjunction with the accompanying drawings, wherein:

Fig. 1 is a view in perspective of a rod weeder embodying the features of the present invention connected to a tractor to be drawn thereby;

Fig. 2 is an enlarged view in side elevation, partly in section, of the structure shown in Fig. 1; and Fig. 3 is a sectional view of a portion of the adjusting structure shown in Fig. 2.

Referring to the drawings, numeral 1 designates the main frame of a rod weeder comprising front and rear transverse frame members 2 and 3, respectively, connected by side bars 4 and 5. The rectangular frame so formed is further braced by angle bars 6. Secured to the right-hand end of the forward frame member 2 is a strap 7 having a portion extending outwardly and rearwardly and having mounted thereon, upon a stub axle 8, an idler sprocket wheel 9.

The frame 1 is supported on wheels 10 and 11. Each of these wheels is carried upon a shaft journaled in a bracket 12 secured to the end frame members 4 and 5. The wheel shaft at the right-hand end of the frame is provided with an extension upon which is mounted a sprocket wheel 13.

At laterally spaced points upon the frame and secured thereto are longitudinally extending beams 14, the rear ends of which are bent downwardly and forwardly and provided at their ends with shoes 15 in which is journaled a transverse rod 16. Secured to the frame member 5 is a strap 17 apertured to receive for rotation a downwardly and laterally angled shaft 18 provided at its outer end with a cap 19 to prevent axial displacement thereof in the strap 17. The inner end of the shaft 18 is connected by a knuckle joint 20 to the rod 16, and keyed to the shaft 18 near its upper end is a sprocket wheel 21.

The sprocket wheel 13 rotates with the ground-engaging wheel 11, and the upper portion thereof engages an endless chain 22 which is trained over the sprockets 9 and 21. Drive is thus transmitted from the wheel 11 to the shaft 18 and therefore to the rod 16 to effect rotation thereof.

The rod weeder of the present invention is adapted to be drawn by a tractor or other vehicle and is provided with a triangular draw-frame indicated at 23 and comprising angle bars 24, the rear ends of which are connected to the forward frame member 2 of the main frame by laterally spaced pivots 25. The bars 24 converge forwardly and are secured together at their ends. Likewise affixed to the forward ends of these bars is a forwardly extending clevis 26 provided with a pin 27 for attachment to the drawbar or the like 28 of a vehicle indicated at 29.

In operation, the rotary rod 16 of the rod weeder travels below the surface of the ground and is rotated by its driving connection with the ground wheel 11. It is desirable to provide mechanism for regulating the depth as the rotary rod 16 travels through the ground. It is likewise desirable to provide means to permit the tool to avoid obstacles. In other words, when encountering a stone or like object on the ground, which impedes the progress of the machine, it is desirable to avoid the shocks incident to striking such an obstruction and to permit the tool to rise upwardly to avoid the obstruction. The main frame is therefore pivoted to the draw-frame for vertical swinging movement of the working tools, and means hereinafter to be described are provided for adjusting this pivotal relationship between the two frames and to permit the tool to rise when an obstruction is encountered, while at the same time providing means for urging the tool back to its normal operating position.

Secured to the draw-frame 23 is an upwardly extending tripod-like structure 30 comprising three rods which are secured at their lower ends to the frame 23 and which converge upwardly and are secured together at 31. Two of the rods are spaced at their upper ends and apertured for the reception of trunnions 32 carried by a bearing 33. The member 34 journaled in the bearing 33 is provided with a threaded sleeve portion 35 and a crank 36 to effect rotation thereof.

Secured to the frame 1 is an upright structure 37 comprising four rods which converge at their upper ends and have secured thereto a U-shaped member 38 provided with upstanding ears for the pivotal mounting of trunnions 39 of a bearing 40. Bearing 40 is adapted to receive for sliding movement therein a rod 41 threaded for reception in the sleeve 35. Rod 41 is prevented from turning about its axis in the bearing 40 by the provision of a pin 42 which projects radially from the rod 41 and is received in grooves 43 in the bearing. Rod 41 extends through the bearing 40, and a shoulder 44 thereon abuts against the end of the bearing. The portion of shaft 41 beyond the shoulder 44 has mounted thereupon a cap member 45 provided with circumferential grooves 46 for the reception of the coils of one end of a spring 47. The other end of the spring 47 is seated in grooves 48 in the bearing 40. By reciprocation of the shaft 41 in the bearing 40 therefor, the spring 47 may be extended.

It should now be clear that the upright structures 30 and 37 on the frames 23 and 1, respectively, may be brought nearer together by manipulation of the crank 36 to screw the rod 41 into the sleeve member 35. The object of such an operation is to pivot the frame 1 about its connection to the draw-frame 23 and thus raise the rotary rod 16 from the ground or adjust its depth of operation.

In normal operating position of the rotary rod 16, as indicated in Figure 1, the spring 47 is in a substantially closed position. Tension thereupon may be increased or decreased by a screw 49 threaded into the cap 45 and abutting against the end of shaft or rod 41. Upon encountering an obstruction, the shaft 41 will slide axially within the bearing 40 and place tension upon the spring 47, the rotary rod and, in fact, the entire frame 1 pivoting upwardly about the connection thereof at 25 to the draw-frame 23, as indicated in dotted lines in Fig. 2. When the obstruction is passed, of course, the spring 47 forces the tool back into its operating position.

It should now be understood that a novel rod weeder of simple construction has been provided, including means for adjusting the operating depth of the working tool and providing resilience for the tool-supporting frame upon the encountering of an obstruction, thus eliminating or minimizing shocks to the implements.

The invention has been described in its preferred form. However, it should be understood that modifications may be made therein without departing from the spirit of the invention or the scope of the appended claims.

What is claimed is:

1. In an agricultural implement, in combination, a main wheel-supported frame, an earth-working tool carried by the main frame, a draw-frame, means pivotally connecting the main frame to the draw-frame for vertical swinging movement with respect thereto about a transverse axis, a first upright support on the draw-frame, a second upright support on the main frame, a member adjustable in length connected to said first support and extending in a direction generally parallel to the longitudinal center line of the implement, a bearing on the second support slidably receiving the free end of said member, a tension spring secured to the free end of said member and to said bearing, said spring being substantially closed in the normal operating position of the tools and extendable to permit pivotal movement of the main frame with respect to the draw-frame, and means for adjusting the length of said member to increase the tension upon said spring and urge the main tool-carrying frame downwardly.

2. In an agricultural implement, in combination, a main wheel-supported frame, an earth-working tool carried by the main frame, a draw-frame, means pivotally connecting the main frame to the draw-frame for vertical swinging movement with respect thereto about a transverse axis, a first upright support on the draw-frame, a second upright support on the main frame, a member adjustable in length having a pivotal connection with the first support and a slidable connection with the second support to permit pivoting of the main frame relative to the draw-frame and having a portion extending beyond the second support, a tension spring having one end anchored to the end of said member extending beyond the second support and having its other end secured to the second support, whereby an increase in the length of said member increases the tension upon said spring and urges the main tool-carrying frame downwardly, said spring being substantially closed in the normal operating position of the tool, and a stop limiting the downward movement of the main frame.

HOWELL N. JAMES.

REFERENCES CITED

The following references are of record in the file of this patent:

UNITED STATES PATENTS

| Number | Name | Date |
| --- | --- | --- |
| 861,323 | Sharick | July 30, 1907 |
| 1,068,560 | Bean | July 29, 1913 |
| 1,297,908 | Ray | Mar. 18, 1919 |
| 1,340,581 | Van Brunt | May 18, 1920 |
| 1,506,820 | Erdman et al. | Sept. 2, 1924 |
| 2,124,005 | Pancheri | July 19, 1938 |
| 2,221,751 | Benjamin | Nov. 19, 1940 |
| 2,325,882 | Scarlett | Aug. 3, 1943 |
| 2,332,616 | Tuft | Oct. 26, 1943 |
| 2,340,497 | Thomas | Feb. 1, 1944 |

FOREIGN PATENTS

| Number | Country | Date |
| --- | --- | --- |
| 114,331 | Australia | Dec. 2, 1941 |
| 331,646 | Great Britain | July 10, 1930 |